United States Patent
Wiryawan et al.

(10) Patent No.: US 7,284,005 B1
(45) Date of Patent: Oct. 16, 2007

(54) DATA TRANSFER METHOD AND SYSTEM

(75) Inventors: Antonius Adhi Wiryawan, Hayward, CA (US); Re Lai, Belmont, CA (US); Weide Ju, Cupertino, CA (US); Hichem Sellami, Oakland, CA (US); Durgesh Kotwal, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 386 days.

(21) Appl. No.: 10/025,126

(22) Filed: Dec. 18, 2001

(51) Int. Cl.
*G06F 17/00* (2006.01)
(52) U.S. Cl. .................. 707/101; 707/102; 707/103 R; 707/104.1; 707/201; 707/205
(58) Field of Classification Search .............. 707/1–10, 707/100–104.1, 200–206
See application file for complete search history.

(56) References Cited

U.S. PATENT DOCUMENTS

| | | | | |
|---|---|---|---|---|
| 5,699,527 A | | 12/1997 | Davidson | 395/238 |
| 6,014,670 A | * | 1/2000 | Zamanian et al. | 707/101 |
| 6,301,586 B1 | | 10/2001 | Yang et al. | 707/104 |
| 6,496,835 B2 | * | 12/2002 | Liu et al. | 707/102 |
| 6,564,307 B1 | * | 5/2003 | Micka et al. | 711/156 |
| 6,694,338 B1 | * | 2/2004 | Lindsay | 707/203 |
| 6,711,575 B1 | * | 3/2004 | Applewhite et al. | 707/100 |
| 6,823,495 B1 | * | 11/2004 | Vedula et al. | 715/805 |
| 6,889,260 B1 | * | 5/2005 | Hughes | 709/246 |
| 7,035,820 B2 | | 4/2006 | Goodwin et al. | 705/37 |
| 2002/0091732 A1 | * | 7/2002 | Pedro | 707/505 |
| 2003/0004965 A1 | * | 1/2003 | Farmer et al. | 707/104.1 |
| 2003/0112306 A1 | | 6/2003 | Simpson et al. | 347/101 |

OTHER PUBLICATIONS

Wiryawan et al., "Methods And Apparatus For Capturing Consumer Loan Application Data," U.S. Appl. No. 10/025,523, filed on Dec. 18, 2001.
Wiryawan et al., "Method and Apparatus for Capturing Commercial Loan Application Data and Assigning a Commercial Loan Request," U.S. Appl. No. 10/024,990, filed on Dec. 19, 2001.

* cited by examiner

*Primary Examiner*—Isaac Woo
(74) *Attorney, Agent, or Firm*—Campbell Stephenson LLP

(57) ABSTRACT

Methods, apparatus, and articles of manufacture for transferring data from a defined source business component to a defined destination business component and/or between user-specified fields associated with the defined business components are disclosed herein. Embodiments of the invention enable a user to populate data fields of a first user interface display with data previously entered in data fields of a second user interface display by mapping the location of the data within a database, to the data fields of the first user interface display.

12 Claims, 6 Drawing Sheets

DATA TRANSFER METHOD AND SYSTEM

TECHNICAL FIELD OF THE INVENTION

This disclosure relates generally to data transfer mechanisms, and more particularly, but not exclusively, to methods, apparatus, and articles of manufacture for mapping data, stored in a structured environment, from a source business component to a destination business component.

BACKGROUND INFORMATION

The electronic storage of information has vastly increased the amount of data that may be maintained in relation to various records, such as database records, and the like. In many cases, organizations store data in a relational database management system to enable the data to be accessible to users via requests structured according to a database schema. For example, customer profile data corresponding to a new customer of a bank may be input by a bank representative into a series of data fields, for example, provided via a user interface ("UI") display. The customer profile data may then be stored in the database to enable the retrieval thereof in the context of the original UI display.

However, no adequate mechanism exists for associating the data (e.g., the customer profile data) with data fields in a different UI display in the event that a user desires the same data to correspond to the two UI displays. For example, assume that a customer, whose customer profile data had previously been entered into the original UI display and stored in the database, returned to the bank to apply for an automobile loan. Because an auto loan application will typically require at least a portion of the same customer profile data previously entered by the bank representative, re-entry of the data into the data fields of the different UI, corresponding to the auto loan application, will be necessitated. This not only decreases the productivity of the bank representative, but increases the potential for the introduction of errors associated with the data in the auto loan application.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Figure 1:
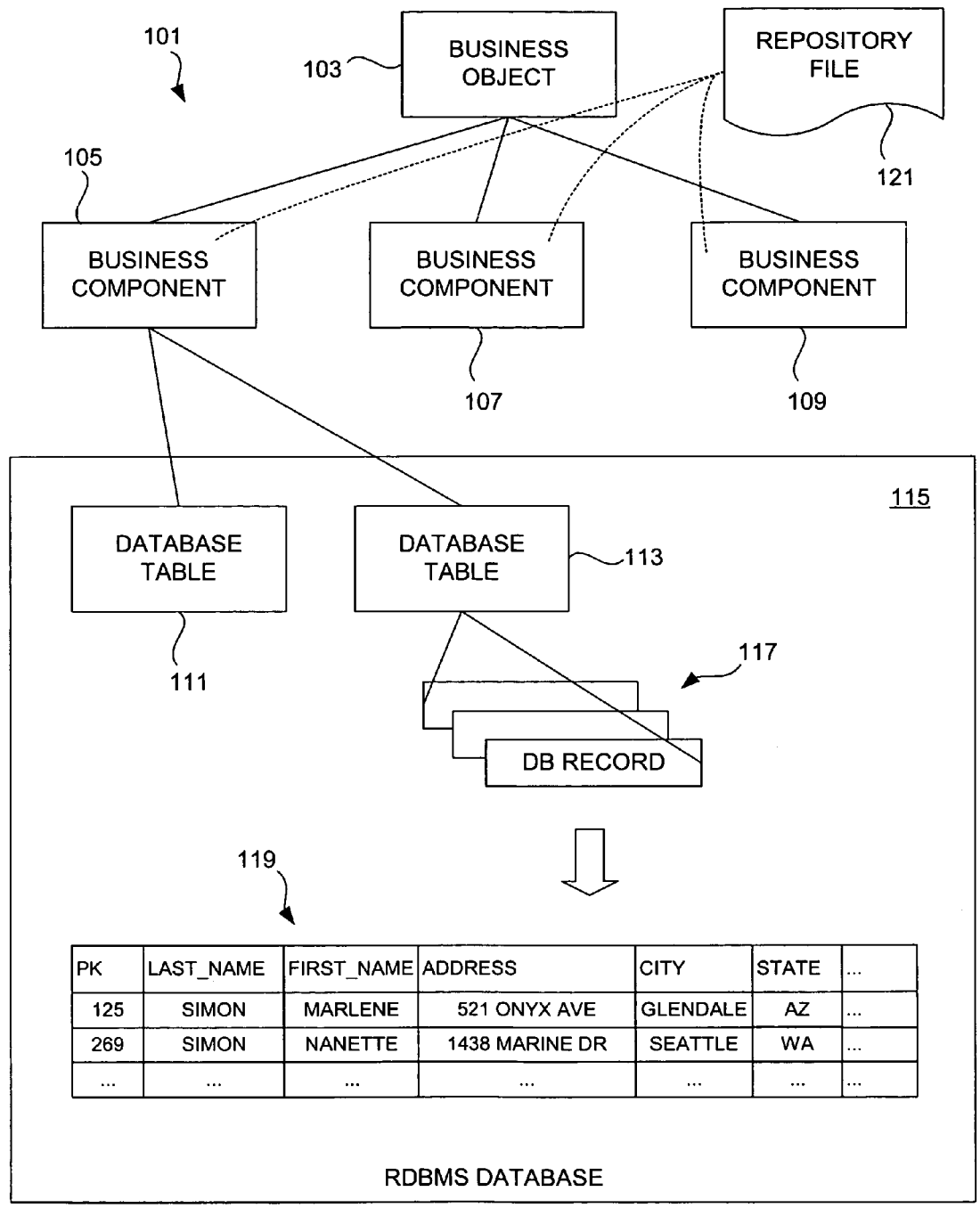
FIG. 1 is an illustration of an embodiment of a multi-layer data architecture in accordance with the teachings of the present invention.

Embodiments of methods, apparatus, and articles of manufacture for transferring data from a source business component to a destination business component and/or between user-specified fields within the business components are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide methods, apparatus, and articles of manufacture for transferring data from a defined source business component to a defined destination business component and/or between user-specified fields associated with the defined business components to enable a user to populate data fields of one UI display with data previously entered in data fields of another UI display.

In one representative example in accordance with the teachings of the present invention, a customer may approach an organization seeking a particular product or service. In order to maintain records corresponding to their customers, the organization may collect customer profile data corresponding to the customer, and store the data in a relational database, or other structured environment, by entering the data into data fields of a form applet, or the like, in an embodiment. If all or a portion of the customer profile data also corresponds to a second set of data fields associated with another UI display (e.g., a second form applet), then instead of re-entering the pertinent customer profile data into the second set of data fields, the user (e.g., an organization representative) may map the data, entered in the form applet and stored in the database, to the second set of data fields. In one embodiment, mapping the data includes initiation of a data transfer utility software application configured to enable the user to define source and destination elements, such as business objects, business components, and/or fields, to map the transfer of data. Other features of the illustrated embodiments will be apparent to the reader from the foregoing and the appended claims, and as the detailed description and discussion is read in conjunction with the accompanying drawings.

With reference now to the drawings, and in particular to FIG. 1, an embodiment of a multi-layer data architecture 101 is illustrated in accordance with the teachings of the present invention. The multi-layer data architecture 101 illustrates logical relationships among a business object 103, business components 105, 107, and 109, and database tables 111 and 113. The logical relationship among these elements 103-113 is hierarchical in nature, with the business object 103 occupying the upper-most layer of the hierarchy, followed by an intermediate layer of one or more business components 105-109, each of which may be associated with one or more database tables 111 and 113, in an embodiment.

Each database table 111, 113 in turn may include a plurality of database records 117 configured to reference data stored in a database 115 pertaining to the business object 103. In one embodiment, the database 115 may comprise a relational database management system ("RDBMS") database with data organized in a manner (see, e.g., reference numeral 119) similar to that illustrated in FIG. 1. A repository file 121 may include data and rules corresponding to a database schema, which, in conjunction with logic associated with the business components 105-109, enables a user to store and access data in the database 115, in an embodiment.

The business object 103 may relate to any one of a number of applications designed primarily for use in business, such as for example, but not limited to, accounting, payroll, financial planning, project management, record maintenance, customer management, or the like. For example, in one embodiment, the business object 103 may comprise a "Contact" object (i.e., customer management), and business components 105-109 may be used to store and access data in the database 115 corresponding to customer profile information, such as names, addresses, and the like. Each business component 105-109 may include, in an embodiment, information for mapping the business component 105-109 to various data stored in the database tables 111, 113. The business components 105-109 may each represent a distinct portion of the functions associated with the business object 103, in an embodiment.

Figure 2:
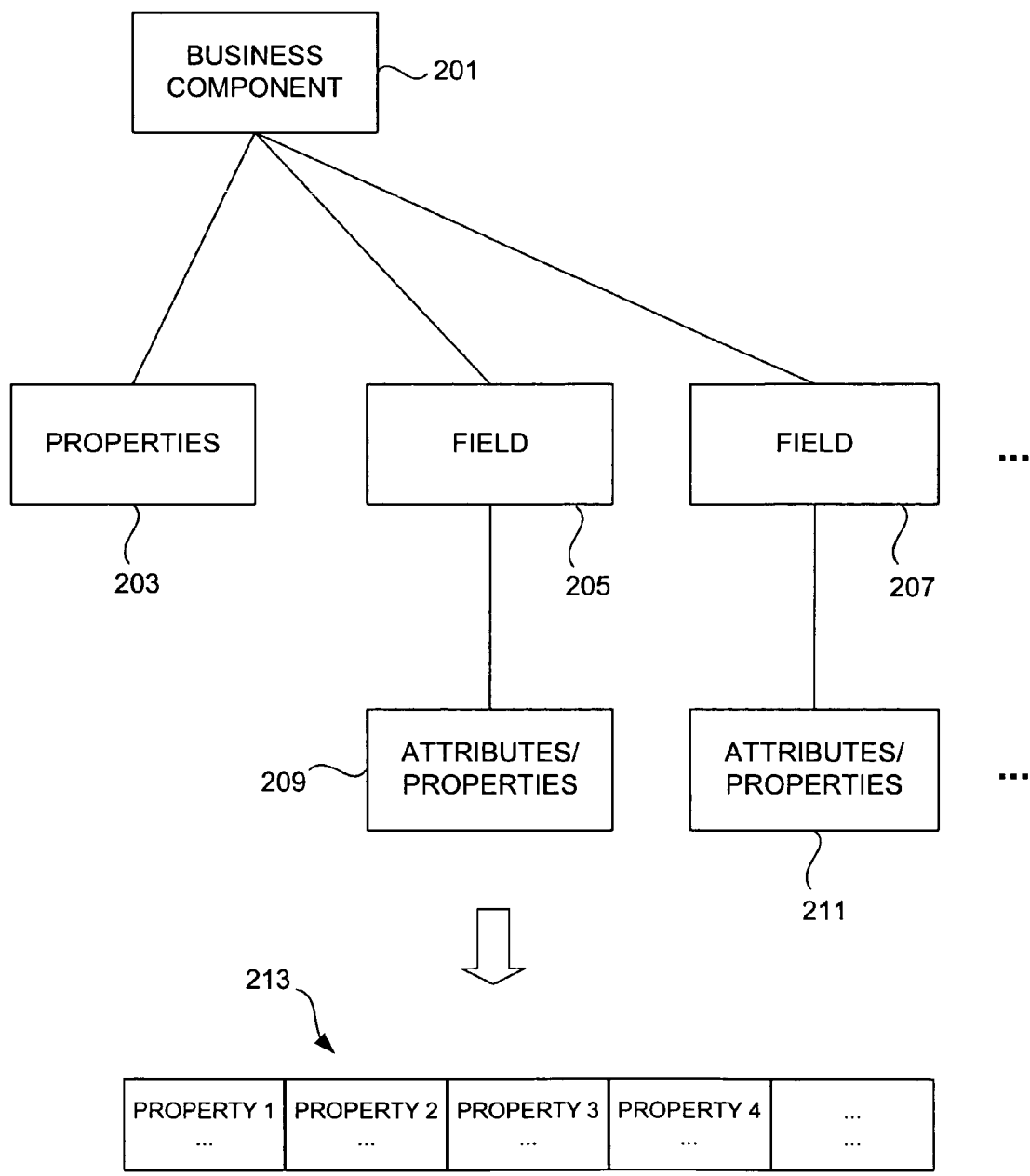
FIG. 2 is a block diagram illustrating an embodiment of a logical structure of a business component in accordance with the teachings of the present invention.

With reference now primarily to FIG. 2, an embodiment of a logical structure of a business component 201 is shown in accordance with the teachings of the present invention. In the illustrated embodiment, the business component 201 (which may comprise any one or more of the business components 105, 107, and 109 illustrated in FIG. 1) may include a set of properties 203 that includes information specific to the respective business component 201. For example, the properties 203 may include information such as a "Name" that specifies a logical name associated with the business component 201, a "Table Name" that specifies a name associated with an underlying database table (e.g., the database tables 111, 113, FIG. 1), and the like.

In one embodiment, the business component 201 may also include a set of fields 205 and 207, each of which may have a set of associated attributes and/or properties 209 and 211, respectively. The fields 205 and 207 may correspond to data fields associated with a UI display, such as a form applet, or the like, in an embodiment. The attributes and/or properties 209, 211 associated with each field 205 and 207, respectively, may include an array of information (see, e.g., reference numeral 213) such as for example, an identifying "Name" associated with the field 205, 207 (e.g., "LAST_NAME"). In addition, the attributes/properties 209, 211 may also include information related to a data type associated with the field 205, 207 (e.g., text, numeric, calculated), and identifying data location information (e.g., rows/columns within the database) to which the field 205, 207 may be mapped within the database 115 (see, e.g., FIG. 1). In one embodiment, a primary key (see, e.g., "PK," reference numeral 119, FIG. 1) may serve as a unique identifier of a specific tuple (row) in the database table (e.g., the database tables 111 and 113, FIG. 1) to which the field is mapped.

It will be appreciated that the business component 201 may span data corresponding to one or more physical database tables (e.g., the database tables 111 and 113, FIG. 1), in an embodiment. The data may also include values, for example, calculated by referencing a base table, and by explicitly joining and linking other tables, including intersection tables, each of which may include a plurality of records (e.g., the records 117) as will be familiar to one skilled in the art.

Having observed the logical relationships among the various elements of the multi-layer data architecture illustrated in FIG. 1, and the logical structure of the business component element illustrated in FIG. 2, attention may now be directed to details of data transfer mechanisms in accordance with the teachings of the present invention.

Figure 3:
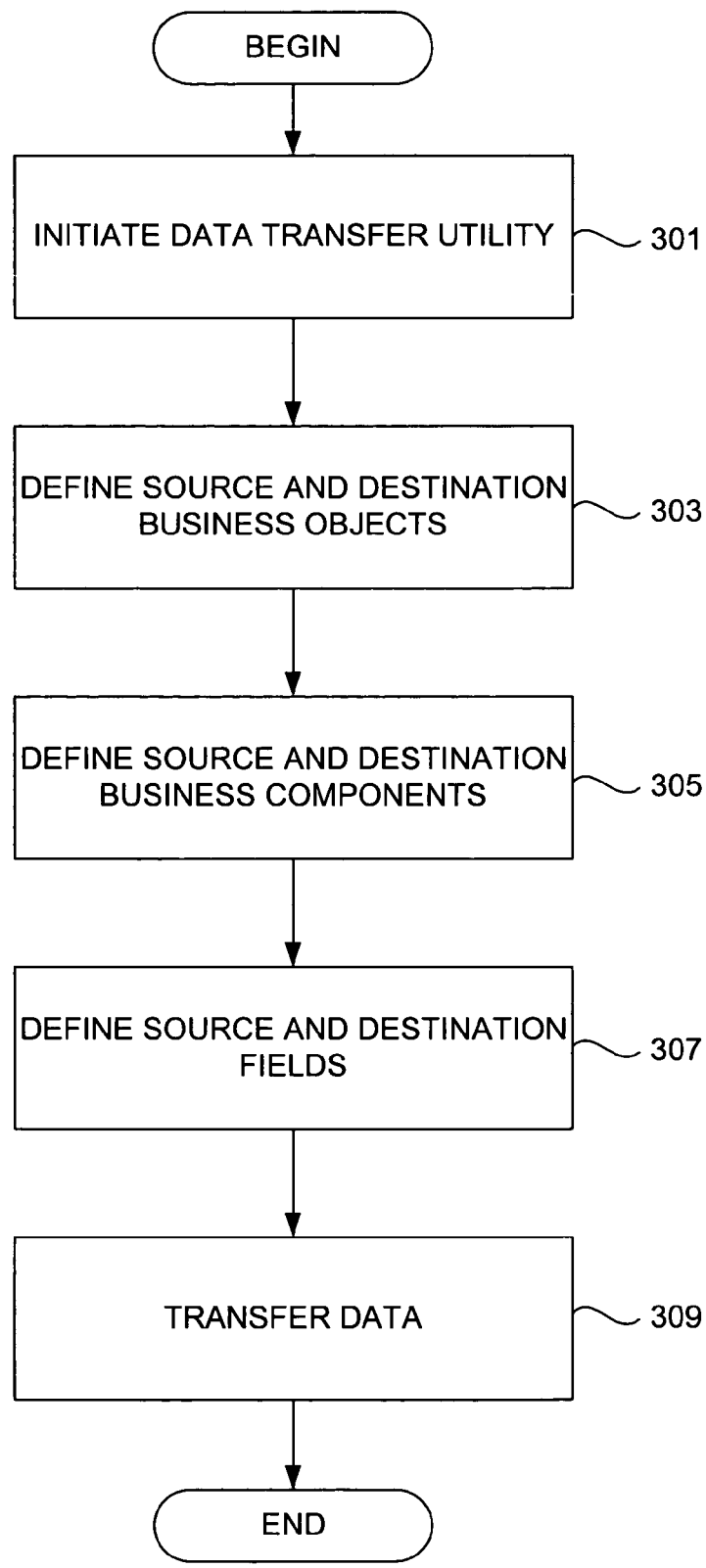
FIG. 3 is a flow diagram illustrating an embodiment of a flow of events in accordance with the teachings of the present invention.

With reference primarily to FIG. 3, a flow diagram, illustrating an embodiment of a flow of events, is shown in accordance with the teachings of the present invention. As the following discussion proceeds with regard to FIG. 3, reference is made to FIGS. 4-6 to illustrate various aspects of the present invention.

In one embodiment, a user (e.g. the organization representative from the example given above) initiates a data transfer utility application (see, e.g., process block 301) in order to populate data fields in a UI display (e.g., an electronic automobile loan application) with data (e.g., customer profile information) previously provided (e.g., by the loan applicant), and stored in a database (e.g., a database maintained by the organization). Initiation of the data transfer utility may be facilitated by user-actuation of a menu option, or the like, provided via a UI display, in an embodiment. It will be appreciated that the storage of data in, and retrieval of data from, the database may be facilitated via a computer, server hardware, or other device. Furthermore, the data transfer utility application, the UI display(s) associated with the auto loan application, and the like, may comprise software applications, in an embodiment, capable of being executed by the computer, or other device, such as that illustrated in FIG. 4.

Figure 4:
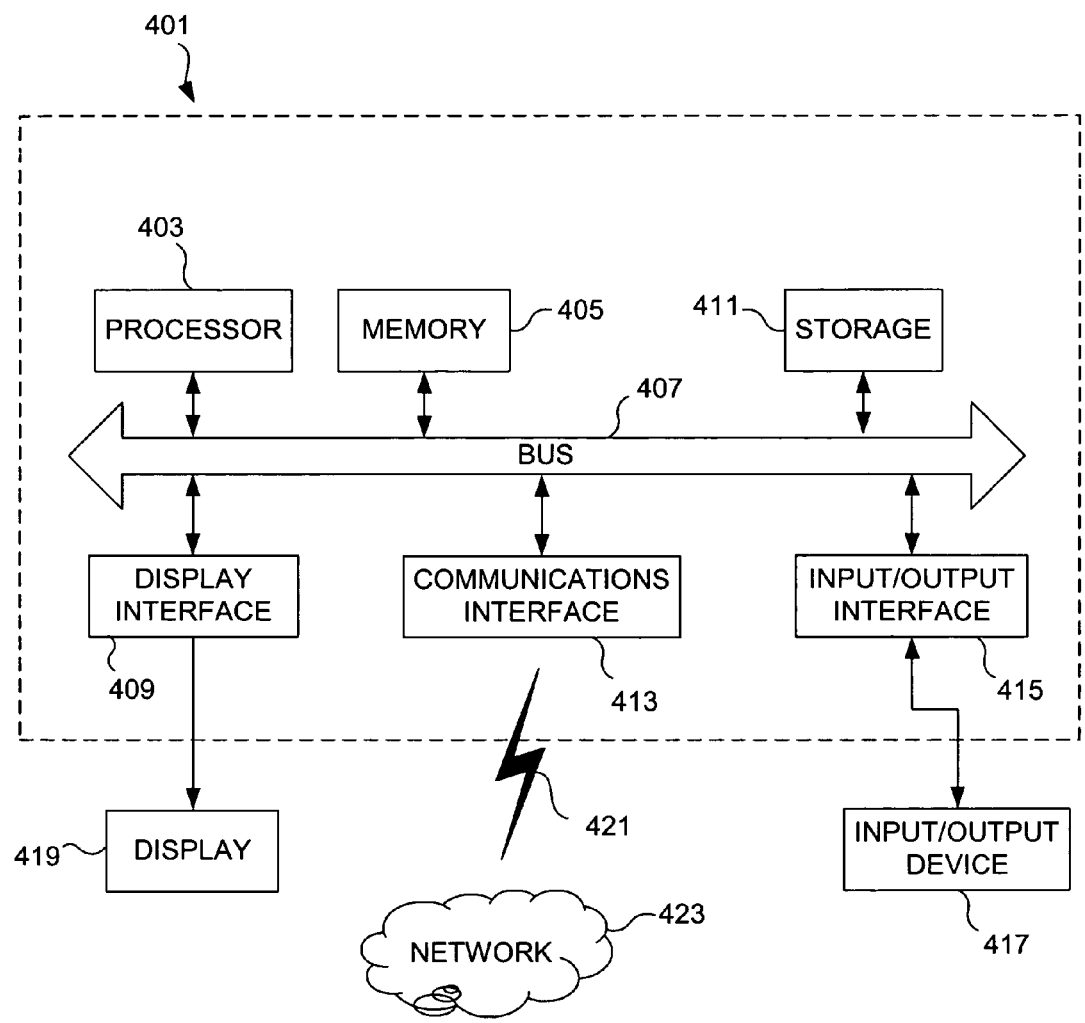
FIG. 4 is a block diagram illustrating an embodiment of a computer system for implementing methodologies in accordance with the teachings of the present invention.

FIG. 4 is a block diagram illustration of an embodiment of a computer system for implementing methodologies in accordance with the teachings of the present invention. In the illustrated embodiment, a computer (also "machine" or "computer system") 401 includes a processor 403 coupled to a bus 407. A memory 405, a storage 411, a display interface 409, a communications interface 413, and an input/output interface 415 are also coupled to the bus 407, in the illustrated embodiment.

In one embodiment, the machine 401 is capable of interfacing with external systems through the communications interface 413. The communications interface 413 may include a radio transceiver compatible with various modulated signals, wireless telephone signals, or the like. The communications interface 413 may also include an Ethernet adapter, an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 421 is received/transmitted between the communications interface 413 and a network 423. The communications signal 421 may be used to interface the machine 401 with another computer system, a network hub, a router, or the like, in various embodiments. In one embodiment, the carrier wave signal 421 is considered to be machine-readable media, which may be transmitted through wires, cables, optical fibers, or through the atmosphere, or the like. The network 423 may comprise the Internet, a wide area network ("WAN"), a local area network ("LAN"), an intranet, or the like, or a combination of one or more of the foregoing.

The processor 403 may be a suitable commercially available processor. The memory 405 may be a machine-readable medium such as dynamic random access memory ("DRAM"), and may include static random access memory ("SRAM"). The display interface 409 controls a coupled display 419, which in one embodiment may be a cathode ray tube ("CRT"), a liquid crystal display ("LCD"), an active matrix display, or the like. An input/output device 417, coupled to the input/output interface 415 may be a keyboard, a disk drive, a printer, a scanner, or other input/output device, including a mouse, a trackpad, or the like.

The storage 411, in one embodiment, may include machine-readable media such as for example, but not limited to, a magnetic hard disk, a floppy disk, an optical disk, a read-only memory component ("ROM"), a smart card, or another form of storage for data. In one embodiment, the storage 411 may include removable media, read-only memory, readable/writable memory, or the like. Some of the data may be written by a direct memory access process into the memory 405 during execution of software in the computer system 401. It will be appreciated that software may reside in the storage 411, the memory 405, or may be transmitted or received via a modem or a communications interface 413. For the purpose of the specification, the term "machine-readable medium" shall be taken to include any medium that is capable of storing data, information, or encoding a sequence of instructions or operations for execution by the processor 403 to cause the processor 403 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Figure 5:
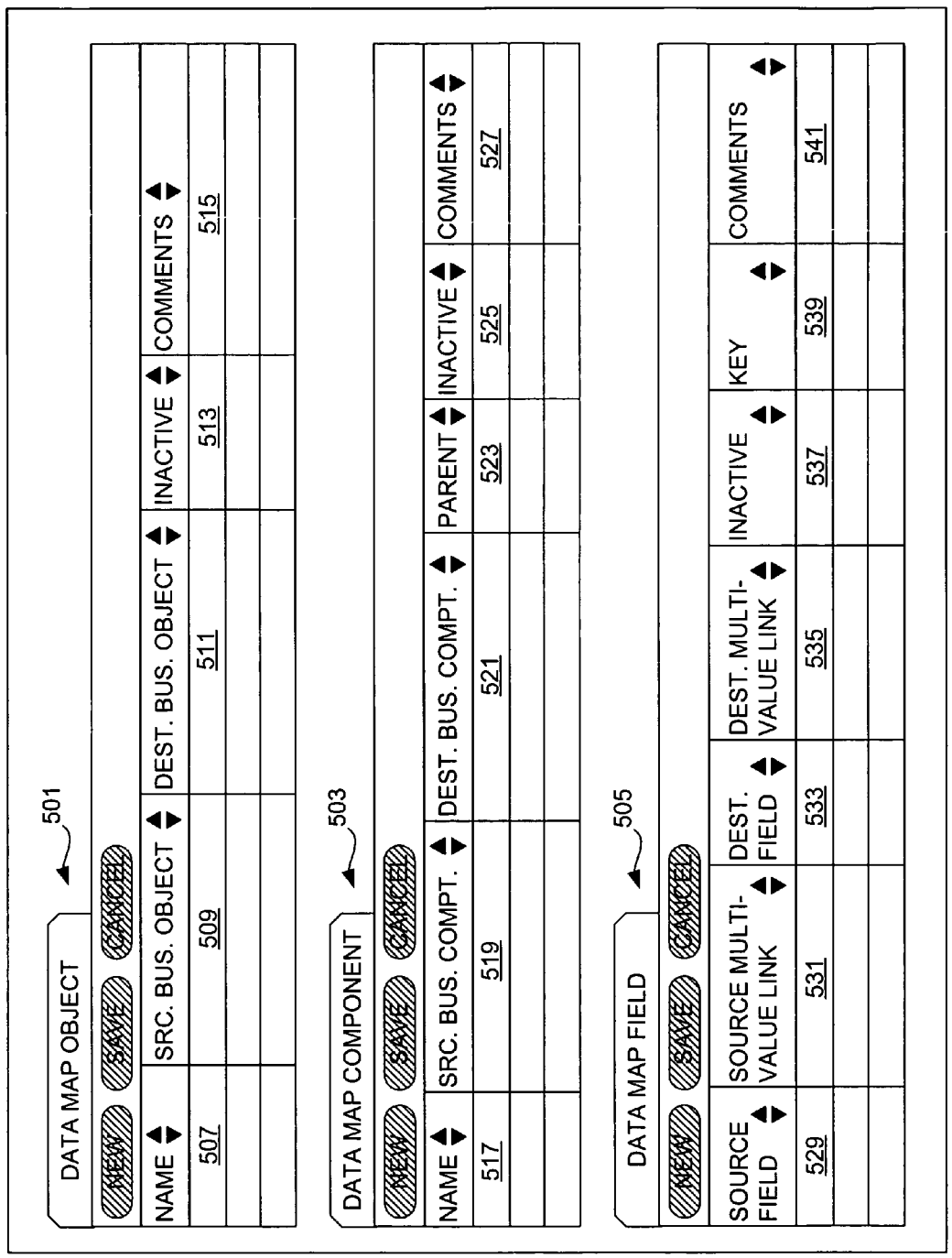
FIG. 5 is an illustration of an example UI display for defining data map elements in accordance with the teachings of the present invention.

With continued reference to FIG. 3, initiation of the data transfer utility application (see, e.g., block 301) may cause generation of a data transfer mapping UI display, such as that illustrated in FIG. 5. In order to transfer data from one location to another, both a source and destination for the data may need to be defined, in an embodiment. It will be appreciated that the transfer of data from one location to another comprises mapping data field(s) of a destination business component/destination business object with the location of the data in the database 115 (see, e.g., FIG. 1), as it exists with regard to data field(s) of a source business component/source business object. So, although data may automatically populate data fields in the destination business component/destination business object following the transfer of data, the physical storage location of the data in the database 115 is not altered, in an embodiment.

The methodologies of the present invention enable a flexible business service that allows the user to map data so that information/data entered in a data field in one UI display, for example, may appear in a data field in another UI display without the necessity of re-entering the information/data. Moreover, a data model supported by the RDBMS (see, e.g., FIG. 1) need not be modified to accomplish the methodologies in accordance with the teachings of the present invention.

Figure 6:
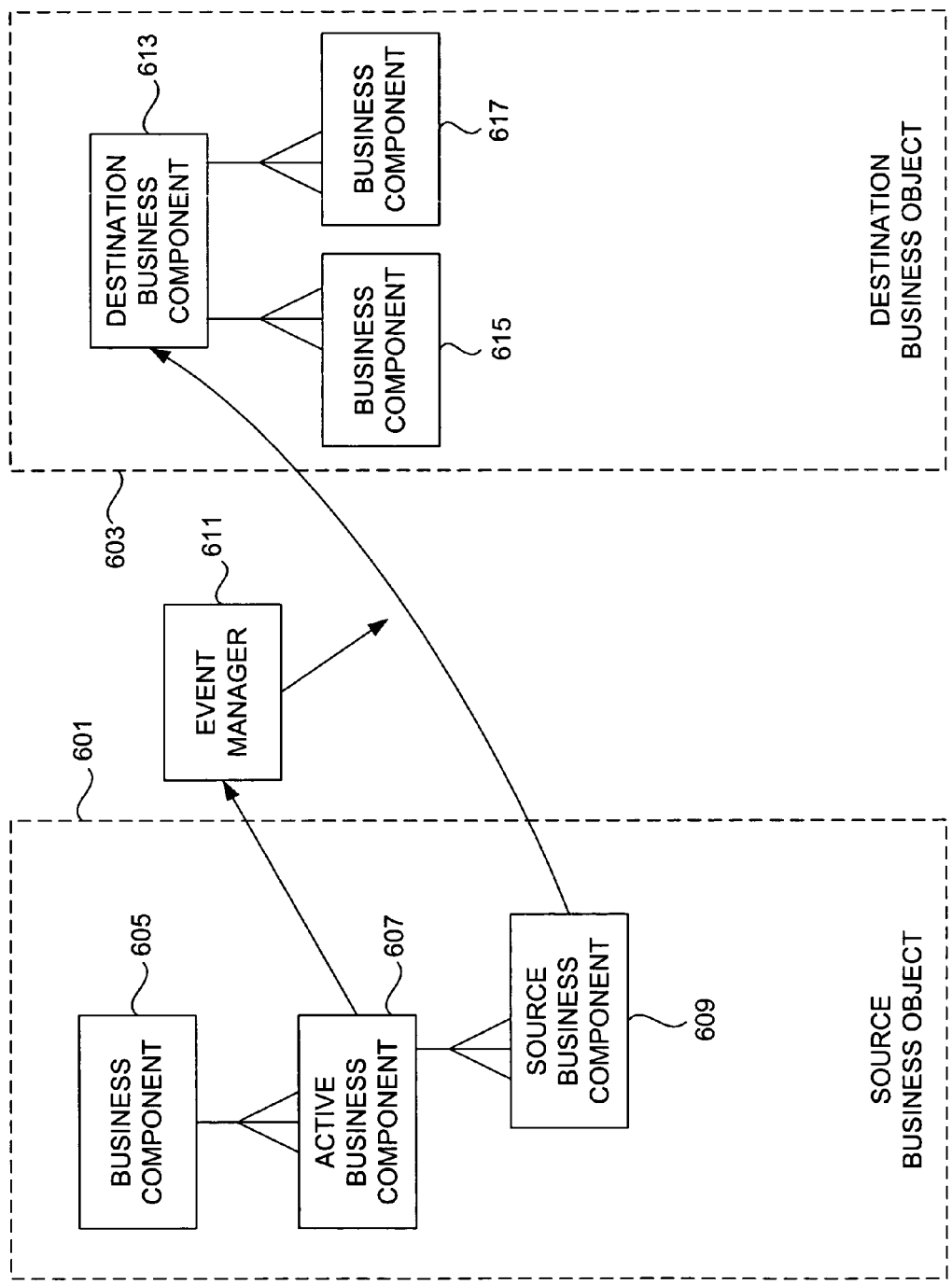
FIG. 6 is a block diagram illustrating an embodiment of a data transfer environment in accordance with the teachings of the present invention.

In order to facilitate the data transfer, the user may, after initiating the data transfer utility, define a source business object associated with the data to be transferred, and a destination business object to which the data will be transferred (see, e.g., process block 303). FIG. 6 is a block diagram, illustrating an embodiment of a data transfer environment in accordance with the teachings of the present invention, showing a source business object 601 and a destination business object 603. In various embodiments, the source business object 601 and the destination business object 603 may be the same or different business objects. In one embodiment, the source business object 601 and the destination business object 603 may be defined by the user, via a data map object applet 501 (see, e.g., FIG. 5), by manual entry of applicable information, or by selection of desired information from a pull-down menu, or the like, for example.

In one embodiment, the user may provide a unique name 507 to identify a data map object. The user may then select or identify the source business object 509 (e.g., the source business object 601, FIG. 6) and the destination business object 511 (e.g., the destination business object 603, FIG. 6). In one embodiment, the specified source and destination business objects will correspond to objects defined in the repository files (e.g., the repository file 121, FIG. 1) associated with the database 115 (see, e.g., FIG. 1). The user may inactivate the defined data map object by selecting an inactive field 513, and may provide additional comments 515 related to the data map object if desired, in an embodiment.

The user may next define a source business component associated with the data to be transferred, and a destination business component to which the data will be transferred (see, e.g., process block 305). As mentioned above, a business object (e.g., the source business object 601 and/or the destination business object 603, FIG. 6) may include a plurality of business components, such as those illustrated in FIG. 6. In the embodiment illustrated in FIG. 6, the source destination object includes a business component 605, an active business component 607, and a source business component 609. Similarly, the destination business object 603 includes a destination business component 613, and two additional business components 615 and 617.

The active business component 607 comprises the business component that is currently active at the moment at which the data transfer utility application is initiated. In a representative scenario, an event (e.g., user actuation of a data transfer utility menu option) may signal an event manager 611 (see, e.g., FIG. 6) to call the data transfer utility application to perform the data transfer operation. It will be appreciated however, that the user may wish to transfer data from a business component (e.g., the source business component 609) other than the active business component 607, in an embodiment, and in fact, any one or more of the illustrated business components 605, 607, and/or 609 may function as the source business component (e.g., the source business component 609) in accordance with the teachings of the present invention. Similarly, any one or more of the business components 613, 615, and/or 617 may function as the destination business component (e.g., the destination business component 613), in an embodiment.

In one embodiment, the source business component 609, and the destination business component 613, may be defined by the user, via a data map component applet 503 (see, e.g., FIG. 5), by manual entry of applicable information or by selection of desired information from a pull-down menu, or the like, for example. The user may provide a unique name 517 to identify a data map component within the data map object, in an embodiment. The user may then select or identify the source business component 519 (e.g., the source business component 609, FIG. 6) and the destination business component 521 (e.g., the destination business component 613, FIG. 6). In addition to the foregoing information, the user may specify a name of a parent data map component 523, in an embodiment. This allows the user to define a hierarchical structure of the data map components. As discussed above, the user may also indicate an inactive status 525 for the data map component, and provide additional comments 527 related to the data map component if desired, in an embodiment.

The user may next define a source field associated with the data to be transferred, and a destination field to which the data will be transferred (see, e.g., process block 307). Defining source and destination fields enables field-to-field mapping to be performed by the data transfer utility application, in an embodiment. In one embodiment, the source field(s) and the destination field(s) may be defined by the user, via a data map field applet 505 (see, e.g., FIG. 5), by manual entry of information, or by selection of desired information from a menu or the like, for example.

The source field 529 of the data map field applet 505 may be populated, in an embodiment, with two types of data: Field identifiers defined in the source business component (e.g., the source business component 609, FIG. 6) in the repository file 121 (see, e.g., FIG. 1); or a free-text calculated expression. In one embodiment, the data transfer utility application may recognize a calculated expression by looking for specific characters, such as brackets, quotation marks, or the like. If the string in the source field 529 contains any of the specified characters, the data transfer utility application will treat the entry as a calculated expression and evaluate the result at run-time to serve as the source for a data transfer.

The destination field 533 of the data map field applet 505 may also be populated by either the field identifier or the calculated expression, described above, in a manner similar to that for the source field 529. The source multi-value link field 531 and the destination multi-value link field 535 of the data map field applet 505 enable the user to indicate whether the source field 529 and/or the destination field 533 is a multi-value field. Data transfer from a multi-value field to a single-value field is generally not permitted.

In one embodiment, a key field 539 of the data map field applet 505 provides a mechanism to match a destination record with a source record (e.g., the database records 117). For instance, in a data transfer operation, the data transfer utility application will need to find an appropriate record in the destination business component (e.g., the destination business component 613, FIG. 6) to update. To accomplish this, the data transfer utility application locates the appropriate record by matching "keys" with those of the corresponding source fields, in an embodiment. This also enables the data transfer utility application to determine whether a duplicate record with the same "keys" already exists. As described above, the user may also indicate an inactive status 537 of the data map field, and provide additional comments 541 related to the data map field if desired, in an embodiment.

Having completely defined the source and destination elements to enable data transfer, the user next activates the data transfer utility application to cause the data transfer/mapping to occur (see, e.g., process block 309).

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A computerized method comprising:
defining a source element associated with data, the data stored in a first location of a structured environment and mapped to the source element to enable retrieval thereof;
defining a destination element, wherein
the source element comprises a source business object, a source business component, and a first source field all pertaining to a first user interface,
the destination element comprises a destination business object, a destination business component, and a first destination field all pertaining to a second user interface, and
said defining the source element and defining the destination element comprises identifying the source business object, the source business component, the first source field, the destination business object, the destination business component, and the first destination field via a user interface display comprising at least one form applet; and
mapping the source element to the destination element, wherein
said mapping comprises mapping the first source field to the first destination field, and
executing said mapping
provides an unchanged image of data mapped to the first source field to the first destination field for display on the second user interface,
maintains the state of the data and the mapping of the data to the first source field, and
maintains the data only in the first location of the structured environment.

2. The method of claim 1, wherein the source business object and the destination business object comprise different business objects.

3. The method of claim 1, wherein the source business component comprises an active business component.

4. The method of claim 1, where mapping the source element to the destination element comprises:
incorporating data location information from the first source field into the first destination field.

5. A machine-readable medium comprising instructions, executable by a processor, to cause said processor to perform operations comprising:
identifying data stored in a first location of a structured environment and mapped to a user-specified source, the user-specified source including a source business object, a source business component, and a first source field pertaining to a first user interface, wherein said identifying further comprises
causing generation of a user interface display, the user interface display including a plurality of data fields corresponding to the source business object, the source business component, and the first source field, the plurality of data fields configured to receive a user input to specify the source, and processing the user input to identify the data corresponding to identifying data location information associated with the first source field;

mapping the data to a user-specified destination, wherein the user-specified destination comprises a destination business object, a destination business component, and a first destination field pertaining to a second user interface, the data remains mapped to the user-specified source, and executing said mapping the data to the user-specified destination provides an unchanged image of data mapped to the first source field to the first destination field for display on the second user interface, maintains the state of the data and the mapping of the data to the first source field, and maintains the data only in the first location of the structured environment; and wherein the machine readable medium comprises any medium configured to store data or information, or encoding a sequence of instructions and operations for execution by the processor, and is other than a carrier-wave signal.

6. The machine-readable medium of claim 5 further comprising instructions for said mapping the data to the user-specified destination, said instructions executable by the processor to cause the processor to perform operations comprising:

incorporating data location information associated with the first source field into the first destination field.

7. The machine-readable medium of claim 5 further comprising instructions for said mapping the data to the user-specified destination, said instructions executable by the processor to cause the processor to perform operations comprising:

causing generation of a user interface display, the user interface display including a plurality of data fields corresponding to the destination business object, the destination business component, and the first destination field, the plurality of data fields configured to receive a user input to specify the destination.

8. The machine-readable medium of claim 5 further comprising instructions for said mapping the data to the user-specified destination, said instructions executable by the processor to cause the processor to perform operations comprising:

mapping the data to the destination business object, wherein the destination business object comprises the source business object.

9. An apparatus, comprising:

a processor;

an input/output interface, coupled to the processor, configured to communicate with an input/output device;

a communications interface, coupled to the processor, configured to communicate with a database, wherein the database includes data stored according to a schema and mapped to a source to enable retrieval thereof, the source including a source business object, a source business component, and at least one source field pertaining to a first user interface;

a memory, coupled to the processor, configured to store a plurality of instructions, wherein execution of the plurality of instructions by the processor, in response to a user input of the source and a destination via the input/output device, causes identification of the data mapped to the source and incorporation of identifying data location information associated with the first source field into a first destination field, wherein the destination includes a destination business object, a destination business component, and the first destination field, all pertaining to a second user interface, said incorporation provides an unchanged image of data mapped to the first source field to the first destination field for display on the second user interface, maintains the state of the data and the mapping of the data to the first source field, and maintains the data only in the first location of the structured environment; and a display interface, coupled to the processor, configured to communicate with a coupled display, wherein execution of the plurality of instructions by the processor further causes the display interface to cause generation of a user interface display on the coupled display, the user interface display including a plurality of data fields corresponding to the source and destination business objects, the source and destination business components, the first source field, and the first destination field, the plurality of data fields configured to receive the user input of the source and the destination.

10. The apparatus of claim 9, wherein the database comprises a relational database management system database.

11. The apparatus of claim 9, wherein the user interface display includes a plurality of form applets configured to enable a user to input source and destination information.

12. The apparatus of claim 9, wherein the data field corresponding to the first source field may be populated with a field identifier defined in the source business component or a free-text calculated expression.

* * * * *